US006985823B2

(12) United States Patent
Fishman et al.

(10) Patent No.: US 6,985,823 B2
(45) Date of Patent: Jan. 10, 2006

(54) SYSTEM AND METHOD OF TESTING A TRANSCEIVER

(75) Inventors: Alex Fishman, Sunnyvale, CA (US); Serguei Dorofeev, Sunnyvale, CA (US); Dmitri Bannikov, Mountain View, CA (US); Robert Lee Fennelly, San Jose, CA (US); Andreas Weber, Los Altos, CA (US); Subra Nagarajan, Livermore, CA (US)

(73) Assignee: Finisar Corporation, Sunnyvale, CA (US)

( * ) Notice: Subject to any disclaimer, the term of this patent is extended or adjusted under 35 U.S.C. 154(b) by 57 days.

(21) Appl. No.: 10/696,253

(22) Filed: Oct. 29, 2003

(65) Prior Publication Data

US 2004/0153267 A1 Aug. 5, 2004

Related U.S. Application Data

(63) Continuation-in-part of application No. 10/285,082, filed on Oct. 31, 2002, and a continuation-in-part of application No. 10/285,081, filed on Oct. 31, 2002.

(60) Provisional application No. 60/423,968, filed on Nov. 5, 2002, provisional application No. 60/423,959, filed on Nov. 5, 2002, provisional application No. 60/422,598, filed on Oct. 31, 2002.

(51) Int. Cl.
*G06F 19/00* (2006.01)

(52) U.S. Cl. .......................... 702/69; 702/79; 702/189; 375/226

(58) Field of Classification Search .................. 702/66, 702/69–76, 78, 79, 108, 117, 118, 120, 124–126, 702/189, 193; 375/224, 226, 219, 376; 714/48, 714/49, 700, 704, 738, 742, 799, 814, 815, 714/819–822, 824; 370/241, 242, 516–519; 324/753, 616; 708/831

See application file for complete search history.

(56) References Cited

U.S. PATENT DOCUMENTS

| 5,268,949 A | 12/1993 | Watanabe et al. ............. 377/33 |
| 5,748,672 A | 5/1998 | Smith et al. ................. 375/226 |

(Continued)

OTHER PUBLICATIONS

Yi Cai et al., "Jitter testing for gigabit serial communication transceivers", Jan.-Feb. 2002, IEEE Design & Test of Computers, vol. 19, issue 1 pp. 66-74.*

(Continued)

*Primary Examiner*—Hal Wachsman
(74) *Attorney, Agent, or Firm*—Workman Nydegger

(57) ABSTRACT

A system and method for testing the jitter tolerance and signal attenuation tolerance of an optoelectronic device is disclosed. The system includes a generation circuit, delay circuit and comparison circuitry. A first sequence of bits is generated, delayed, and sent to the optoelectronic device. The optoelectronic device receives the bits and retransmits them as a second sequence to the comparison circuitry, which compares the two bit sequences to determine a bit error rate. The bit error rate is then used to determine the jitter tolerance and, in an alternate embodiment, the signal attenuation tolerance of the optoelectronic device being tested.

22 Claims, 10 Drawing Sheets

U.S. PATENT DOCUMENTS

| | | | |
|---|---|---|---|
| 5,761,216 A | 6/1998 | Sotome et al. | 714/738 |
| 5,835,501 A * | 11/1998 | Dalmia et al. | 714/704 |
| 6,661,836 B1 | 12/2003 | Dalal et al. | 375/226 |
| 6,694,462 B1 | 2/2004 | Reis et al. | 714/724 |
| 6,834,367 B2 * | 12/2004 | Bonneau et al. | 714/738 |
| 2003/0223526 A1 * | 12/2003 | Sorna | 375/376 |

OTHER PUBLICATIONS

U.S. Appl. No. 10/285,081, filed Oct. 31, 2002, Fishman et al.

U.S. Appl. No. 10/285,082, filed Oct. 31, 2002, Fishman et al.

U.S. Appl. No. 10/695,477, filed Oct. 28, 2003, Fishman et al.

Yi Cai er al., "Jitter testing for gigabit serial communication transceivers", Jan.-Feb. 2002, IEEE Design and Test of Computers, vol. 19, Issue 1, pp. 66-74.

* cited by examiner

US 6,985,823 B2

SYSTEM AND METHOD OF TESTING A TRANSCEIVER

CROSS-REFERENCE TO RELATED APPLICATIONS

The present application is a Continuation-in-Part Application of U.S. patent application Ser. No. 10/285,082, filed on Oct. 31, 2002 and entitled "A System and Method of Processing a Data Signal," which is currently pending, and U.S. patent application Ser. No. 10/285,081, filed on Oct. 31, 2002 and entitled "A System and Method of Detecting a Bit Processing Error," which is currently pending, both of which are also hereby incorporated by reference in their entireties. The present application also claims priority to and the benefit of U.S. Provisional Patent Application No. 60/423,968, filed on Nov. 5, 2002 and entitled "A System and Method of Measuring a Signal Propagation Delay," U.S. Provisional Patent Application No. 60/422,598, filed on Oct. 31, 2002 and entitled "A System and Method of Measuring Turn-On and Turn-Off Times of an Optoelectronic Device," and U.S. Provisional Patent Application No. 60/423,959 filed on Nov. 5, 2002 and entitled "A System and Method of Testing a Transceiver," all of which are hereby incorporated by reference in their entireties.

BACKGROUND OF THE INVENTION

1. The Field of the Invention

The present invention relates generally to an improvement in the ability of test systems to test bit processing capacities of optoelectronic transceivers, and in particular an improvement in their ability to test the jitter tolerance and signal attenuation tolerance (sensitivity) of an optoelectronic transceiver.

2. The Relevant Technology

A bit error rate, also known as a bit error ratio (BER), is a ratio of bits received, processed, and/or transmitted with errors to a total number of bits received, processed, and/or transmitted over a given period of time. A BER is typically expressed as ten to a negative power. If, for example, a transmission has 1 million bits and one of these bits is in error (e.g., a bit is in a first logic state instead of a second logic state), the transmission has a BER of $10^{-6}$. The BER is useful because it provides one measurement of the ability of a device to receive, process, and/or transmit bits.

Many devices are designed to receive, process, and then transmit a plurality of bits. An optoelectronic transceiver, for example, receives a plurality of bits in an electrical form and then transforms and transmits the bits in an optical form and/or receives a plurality of bits in an optical form and then transforms and transmits the bits in an electrical form.

To derive a BER for a device under test (DUT), bits transmitted to the DUT are compared to corresponding bits transmitted by the DUT or to corresponding bits in a pattern used to generate the bits transmitted to the DUT. In some applications, the BER of a DUT must be below a defined threshold for the DUT to pass a test.

A Bit Error Rate Test or Tester ("BERT") is a procedure or device that establishes a BER for a DUT or to otherwise quantify a DUT's ability to receive, process, and/or transmit bits. More specifically, a BERT measures the BER of a transmission (e.g., bits transmitted, received, or processed) over a given period of time by a DUT. An exemplary BERT includes, among other components, a serializer/deserializer ("SERDES") and a clock source fixed to a host board, such as a printed circuit board (PCB), etc. Typically, the SERDES produces serial encoded data (e.g., the bits) used to establish a BER for a DUT. More specifically, serial encoded data is transmitted from a SERDES to a DUT, which attempts to transmit the serial encoded data back to the SERDES. The SERDES compares the output of the DUT to the input to the DUT (or what the input should have been), to establish a BER.

One of the characteristics that can adversely affect the BER is jitter. Jitter can be defined as an unwanted phase modulation of a digital signal. Jitter is comprised of random (i.e., unpredictable) jitter and deterministic jitter. Deterministic jitter is caused by process or component interactions of a system. Random jitter is typically caused by thermal (or other random) noise effects of a system that affect the phase of the clock and/or data signals. For measurements encompassing jitter, it is necessary to collect sufficient amounts of data to have a statistically valid jitter distribution. Histogram data of jitter should include, therefore, many thousands or millions of acquisitions to yield valid statistics.

Jitter performance of devices (e.g., a SERDES, a DUT) is specified in terms of jitter generation, jitter transfer, and jitter tolerance. Jitter generation can be defined as the amount of jitter added to a clock and/or data signal by a device. Jitter transfer is the amount of jitter present in a clock and/or data input signal received by a device that is transferred, by the device, to the clock and/or data output signal of the device. Jitter transfer can change with the data rate, so jitter transfer is typically expressed as the ratio of output jitter to input jitter at a specific data rate.

Jitter tolerance is defined as the ability of a device to correctly determine the value or state of a received data signal despite jitter. Jitter tolerance can be further defined as the amount of jitter in a data signal received by a device that causes, for example, the BER of the device to exceed a specified limit. Devices that process a digital signal (e.g., a DUT) must determine whether a sample, such as a voltage level, of a data signal, falls within the range of a first logic state or a second logic state (i.e. a binary one or a binary zero).

The device compares the sample to a reference value, such as a reference voltage, to determine whether the sample represents the first logic state or the second logic state. If the sample is greater than or equal to the reference value, the sample falls within the range of, for example, the first logic state. But, if the sample is less than the reference value, the sample falls within the range of the second logic state. As noted above, jitter can shift the transition between logic states. As a result, the data signal may not cross the reference value in time for the device to properly determine the intended state of the sample. When this happens, a bit error occurs. As the magnitude of jitter is increased, the incidence of a data signal not crossing the reference value in time for a device to properly determine the intended state of the sample can increase as well. In other words, as the magnitude of jitter is increased, the BER of the device may increase as well.

Another issue with optical sub-assemblies is the attenuation of the power level of an optical signal transmitted to an optical transceiver. When this occurs, a given optical transceiver may not be able to accurately determine the logic state of a given signal. Attenuation can occur because of the great lengths a signal is transmitted, faulty transmitter equipment, poor alignment between connectors, and a host of other reasons.

In the past, measuring power attenuation and jitter for a particular device, such as an optoelectronic transceiver, was a costly operation. For example, an Agilent® Digital Communication Analyzer (Serial BERT 3.6 Gb/s Bit Error Ratio Tester) which currently retails for more than ninety thousand dollars was required to take such measurements with precision comparable to that of the present invention. The AGILENT® mark is a registered mark of AGILENT TECHNOLOGIES, INC. CORPORATION DELAWARE for use in connection with optical equipment and components.

BRIEF SUMMARY OF THE INVENTION

What is needed in the art is a system and method of testing jitter tolerance and signal attenuation tolerance for a device without using the expensive equipment discussed above. The present invention includes systems and methods of testing the jitter tolerance and signal attenuation tolerance (sensitivity) of a device, including optoelectronic transceivers, that is more cost effective than current technologies. One aspect of the present invention includes a system for determining a jitter tolerance of a device, such as a transceiver. This system includes a generation circuit, a delay circuit, and comparison circuitry. The delay circuit is connected to a first transceiver, which is in turn connected to the comparison circuitry. The generation circuit generates a first sequence of bits and transmits these bits to the delay circuit. The delay circuit transmits the bits transmitted by the generation circuit to the first transceiver. Each of the bits transmitted by the delay circuit is subject to a delay prior to being transmitted. The delay is changed by predefined amounts at a predefined frequency while the bits are being transmitted.

The comparison circuitry receives a second sequence of bits from the first transceiver. The first transceiver derives the second sequence of bits from the first sequence of bits transmitted by the delay circuit. The comparison circuitry executes a comparison of the second sequence of bits to the first sequence of bits. From this comparison, the jitter tolerance of the first transceiver is determined.

Another aspect of the present invention includes a system for determining a signal attenuation tolerance of a device, such as a transceiver. This system includes a generation circuit, an attenuator circuit, and comparison circuitry. The attenuator circuit is connected to a first transceiver, which is in turn connected to the comparison circuitry. The generation circuit generates a first signal and transmits this first signal to the attenuator circuit. The attenuator circuit performs an attenuation of a power level of the first signal by a predefined amount and then transmits the first signal to the first transceiver. The comparison circuitry receives a second signal from the first transceiver, which derives the second signal from the first signal. The comparison circuitry executes a comparison of the second signal to the first signal. From this comparison, the signal attenuation tolerance of the first transceiver is determined.

These and other objects and features of the present invention will become fully apparent from the following description and appended claims, or may be by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EXEMPLARY EMBODIMENTS

Reference will now be made to the drawings to describe exemplary embodiments of the invention. It is to be understood that the drawings are diagrammatic and schematic representations of the exemplary embodiments, and are not limiting of the present invention, nor are they necessarily drawn to scale.

Figure 1:
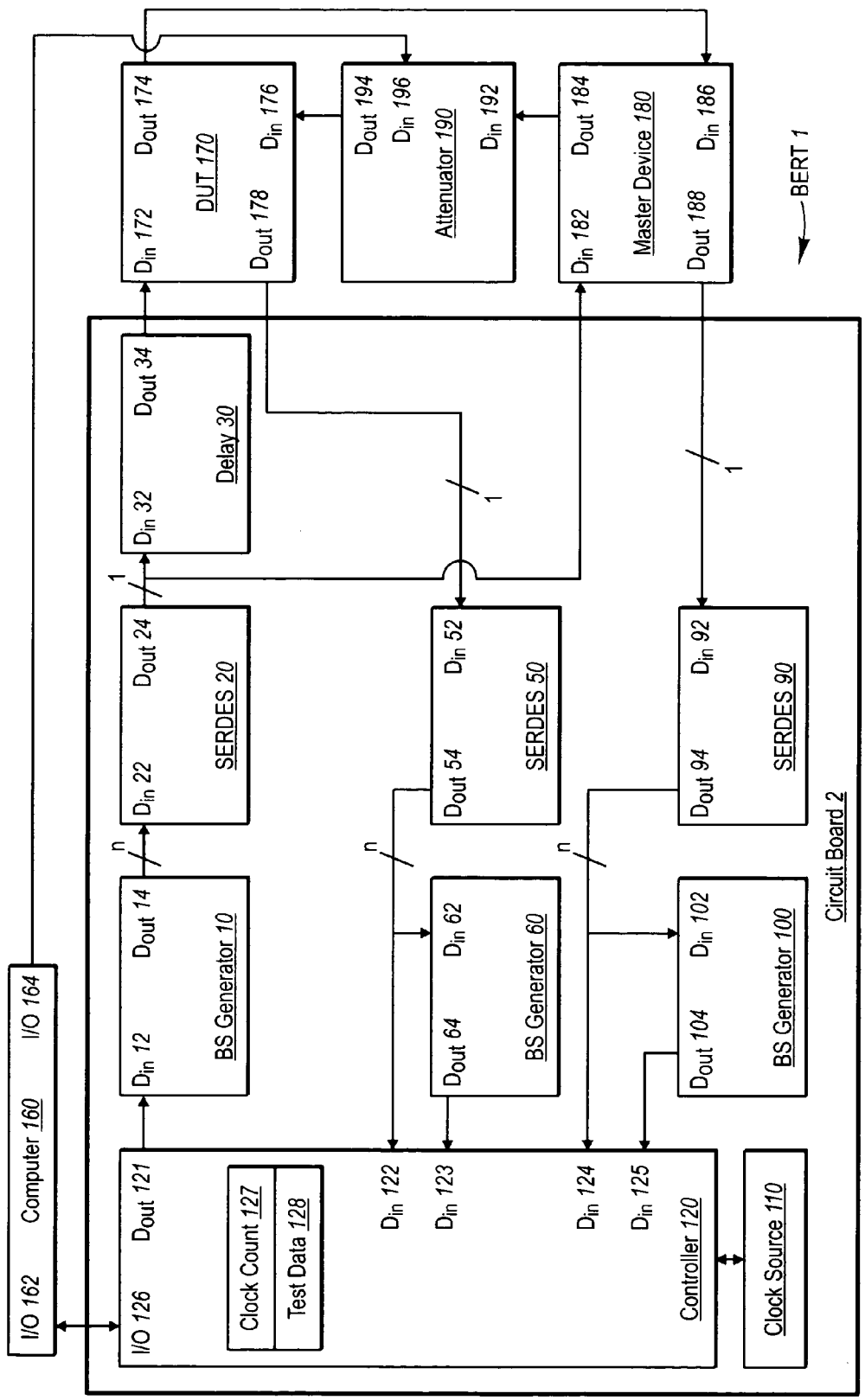
FIG. 1 is a block diagram of a Bit Error Rate Tester of an exemplary embodiment of the present invention.

Referring to FIG. 1, there is shown a BERT 1. BERT 1 includes a circuit board 2 that is an isolated board that provides power and ground connections for various electrical components mounted or housed thereon. Illustratively, mounted to circuit board 2 are a first bit sequence (BS) generator 10, a first serializer/deserializer (SERDES) 20, a programmable delay 30, a second SERDES 50, a second BS generator 60, a third SERDES 90, a third BS generator 100, a clock source 110, and a controller 120. Also electrically connected to BERT 1 is a computer 160, a device under test (DUT) 170 and a master device 180. Further, an attenuator 190 electrically connects master device 180 to DUT 170. As described in detail below, different subsets of these components, devices, etc., may be used to enable various embodiments of the invention.

The BS generators 10, 60, and 100, are linear feedback shift registers. For example, a given BS generator can be a binary shift register with taps that are modulo-2 added together and fed back to the binary shift register as input. Persons skilled in the art recognize that the configuration and function of the taps, or similar circuitry, typically define bit sequences produced by a BS generator. In particular, these configurations and functionalities define a second bit group that is produced when a first bit group is input into a BS generator. Alternatively, BS generators 10, 60, 100 can be any pseudo-random binary sequence or predetermined code generator, as long as the code generating method allows for the creation of any subsequent bit group based on a received part of the sequence.

The bit groups generated by a BS generator are typically output simultaneously in parallel form, but may be output serially as well. Additionally, bit sequences generated by a BS generator are preferably pseudo random bit sequences or other deterministic sequences such as Gold, JPL, and Barker Codes. As a result, a plurality of BS generators can be configured in the same way so that each produces the same bit group from like input.

As illustrated in FIG. 1, BS generators 10, 60, 100 preferably include a $D_{in}$ port 12, 62, and 102, respectively, and a $D_{out}$ port 14, 64, and 104, respectively. The $D_{in}$ port 12, 62, 102 can be a parallel port (n signals, channels, lines, etc.), but can also be a serial port (1 signal, channel, line, etc.), that is used to receive data such as bit groups (e.g., a seed value that identifies a starting bit group in a sequence of bits). The $D_{out}$ port 14, 64, 104 is a parallel port, but can also be a serial port, which is used to transmit bit groups.

The BS generators also can include one or more I/O ports (connections not illustrated) for communicating with controller 120 and for receiving a clock signal originating from clock source 110. Such I/O ports can be parallel or serial ports. The communication can include receiving control signals from controller 120. These control signals can, for example, configure a BS generator (e.g., configure the taps or similar circuitry that defines the type of bit sequences produced and the cycle length, uniformity, and independence of these bit sequences) and initiate and/or terminate the generation of a bit sequence by a BS generator.

The first, second, and third SERDES 20, 50, and 90, can be devices for receiving data in parallel and transmitting this data serially. One example of such a device would be an ON Semiconductor 8-Bit parallel to serial converter MC100EP446, although other devices are possible. As illustrated in FIG. 1, SERDES 20, 50, and 90 include a $D_{in}$ port 22, 52, and 92, respectively, and a $D_{out}$ port 24, 54, and 94 respectively. With respect to first SERDES 20, $D_{in}$ port 22 receives bit groups in parallel and $D_{out}$ port 24 serially transmits bit groups received through $D_{in}$ port 22. With respect to second and third SERDES 50, 90, $D_{in}$ port 52, 92 receive bit groups serially and $D_{out}$ ports 54, 94 transmit, in parallel, bit groups received through $D_{in}$ ports 52, 92.

These three SERDES 20, 50, 90 can also include one or more I/O ports (not illustrated) for exchanging control signals with controller 120 and for receiving a clock signal originating from clock source 110. These ports enable controller 120 to, for example, control how the SERDES receives, transforms, and transmits data. These ports can, furthermore, include a plurality of separate signals for address bits, an alarm interrupt, a chip select, a write input, a read input, a bus type select, a test input, an address latch enable, and other control signals.

The delay 30 illustrated in FIG. 1 is a programmable delay circuit, such as an ON Semiconductor ECL, Programmable Delay Chip MC100EP196, although other devices are possible. As illustrated in FIG. 1, delay 30 includes a $D_{in}$ port 32 and a $D_{out}$ port 34. The data signal is received by delay 30 through $D_{in}$ port 32 and transmitted through $D_{out}$ port 34 after the specified delay. Both leading and trailing edges of data signal pulses are delayed by the same amount of time, which is programmable by the controller 120 using either a serial or parallel data input.

The delay 30 can also include one or more I/O ports (not illustrated) for exchanging control signals with the controller 120 and/or the clock source 110, which can include an adjustable input divider with a following bi-directional clock counter. Output of this bi-directional clock counter or controller 120 sets the specified delay through such I/O ports. The settings of delay 30 can be changed pseudo randomly or by some other function at a specified frequency, for example, from 1 Hz to 1 GHz, and/or amplitude, for example, from 1 picosecond to 10 nanoseconds. Other frequencies and amplitudes may be used based upon the format of data transmission through the DUT 170.

The controller 120 includes a computer processor on a microchip such as, but not limited to, a Motorola® 8-bit processor or other chip combining an 8-bit architecture with an array of field-programmable logic. The MOTOROLA® mark is a registered mark of Motorola, Inc. CORPORATION DELAWARE for use in connection with processors. The controller 120 directs the operation of circuitry on circuit board 2 (not all connections illustrated) and stores and manipulates data provided by this circuitry. Controller 120 completes these tasks, under the direction of computer 160. In some embodiments of the present invention, controller 120 may not have the capacity to perform measurements, which are described below, without computer 160.

As illustrated in FIG. 1, controller 120 includes a $D_{out}$ port 121, a first, second, third, and fourth $D_{in}$ port 122, 123, 124, 125, and an I/O port 126. Using the connections illustrated and connections not illustrated (but mentioned above in connection with other components), controller 120 can send and receive control signals, configuration data, etc. to some or all of the circuitry and/or devices illustrated in FIG. 1.

In particular, controller 120 can configure BS generators 10, 60, 100 and trigger or terminate the generation of bit sequences by BS generators 10, 60, 100. The controller 120 sends data to first BS generator 10 that can include a seed value for the generation of a bit sequence, but can be other data as well. Such data can be sent through $D_{out}$ port 121 or one or more I/O ports that are not illustrated. The controller 120 also transmits and receives control signals, configuration data, etc. to and from second and third BS generators 60, 100 (connections for transmitting data to the second and third BS generators 60, 100 not illustrated).

The controller 120 communicates with computer 160 through I/O port 126. In exemplary embodiments, computer 160 exchanges control signals and/or data with controller 120, which interacts with some or all of the other circuitry on circuit board 2, to setup, initiate, and monitor tests of DUT 170.

The controller 120 also includes logic for comparing a first group of bits to a second group of bits. More specifically, controller 120 compares bits of like position within their respective group of bits (e.g., the second bit in a first group of bits is compared to the second bit in a second group of bits). The controller 120 includes first, second, third, and fourth $D_{in}$ ports 122, 123, 124, 125 to receive bits for these comparisons from second SERDES 50, second BS generator 60, third SERDES 90, and third BS generator 100, respectively.

Finally, controller 120 also includes logic to maintain, increment, and clear a clock count 127, which indicates the number of clock cycles that occur during, for example, a test of DUT 170. The controller 120 can also include logic for storing test data 128, which typically includes a value of clock count 127 and one or more counts of bit errors, which result from the comparisons described in the preceding paragraph. The substance and use of clock count 127 and test data 128 is described in more detail below.

The clock source 110 is designed to provide a clock signal at a desired frequency. The clock source 110 can be a single, self contained circuit (e.g., a Amptron or Cardinal Components, Inc. crystal based oscillator). Such circuits are single frequency circuits, but clock source 110 can also have multiple-frequency capability. The clock source 110 can also have a plurality of circuits including a primary circuit and external timing component (e.g., the bi-directional clock counter mentioned above), which can adjust settings for delay 30 as needed.

The clock source 110 includes a plurality of ports to communicate a clock signal to some or all of the circuitry and devices illustrated in FIG. 1 (ports and connections not illustrated). The clock source 110 includes an I/O port to receive configuration data from controller 120 (e.g., a desired frequency) (ports and connection not illustrated). Also not illustrated in FIG. 1 are one or more demultiplexers and/or one or more dividers or multipliers that can be used to enable clock source 110 to drive two or more components simultaneously at one or more frequencies.

The DUT 170 and master device 180 can be any electronic device capable of receiving, transforming, and transmitting a data signal. Typically, these devices are optoelectronic transceivers, although other devices can receive, transform and transmit data. As such, these devices are capable of receiving a data signal in an electrical form and transmitting the data signal in an optical form and vice versa. Alternatively, master device 180 can be a device other than an optoelectronic transceiver so long as it is capable of generating bit sequences and measuring bit error rates. Each of these devices can include a $D_{in}$ and $D_{out}$ port (e.g., $D_{in}$ port 172, 176 and $D_{out}$ port 174, 178 and $D_{in}$ port 182, 186 and $D_{out}$ port 184, 188 of the DUT 170 and the master device 180, respectively) and one or more I/O ports (not illustrated).

The $D_{in}$ port 172 of DUT 170 can be configured to receive data electrically from delay 30. The $D_{out}$ port 174 of DUT 170 is configured to transmit data optically to master device 180. The $D_{in}$ port 186 of master device 180 can be configured to receive data optically from DUT 170. The $D_{out}$ port 188 of master device 180 can be configured to transmit data electrically to third SERDES 90.

The I/O ports are used to exchange control signals with controller 120. In particular, DUT 170 (and master device 180) can receive, for example, a transmitter disable signal from controller 120. The master device 180 is a device that has been confirmed to operate properly. Any bit errors that occur during a test of the DUT may, therefore, reliably be attributed to DUT 170, and not master device 180.

The attenuator 190 is an optical variable attenuator, such as an EXFO® Optical Test System IQ-203, although other attenuators are possible. The EXFO® mark is a registered mark of EXFO INGENIERIE ELECTRO-OPTIQUE INC. CORPORATION CANADA for use in connection with fiberoptic test equipment. The attenuator 190, which includes a switchable optical power meter, ensures that the optical signal received by DUT 170 from master device 180 is at a specified power level. To do so, attenuator 190 can increase or decrease the power level of the signal received from master device 180.

As illustrated in FIG. 1, attenuator 190 includes $D_{in}$ ports 192, 196 and a $D_{out}$ port 194 to receive an optical signal from master device 180 and transmit an optical signal (at the specified power level or percentage increase or decrease level) to DUT 170. The attenuator also has an I/O port 196 to receive control signals from computer 160. The computer 160 can set the specified power level or percentage increase or decrease level through I/O port 196.

Figure 2:
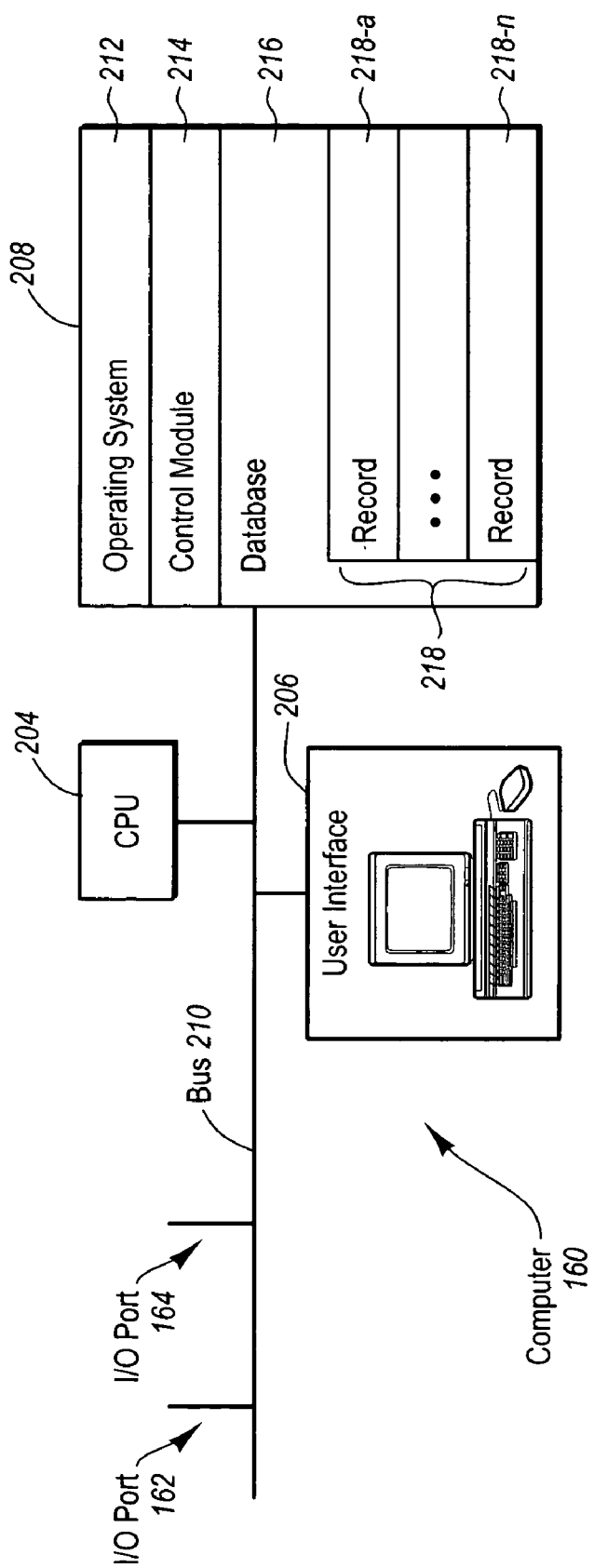
FIG. 2 is a block diagram of a computer of an exemplary embodiments of the present invention.

Referring to FIG. 2, there is shown a more detailed illustration of computer 160. In addition to first and second I/O ports 162, 164, illustrated in FIG. 1, computer 160 includes standard computer components such as one or more processing units 204, one or more user interfaces 206 (e.g., keyboard, mouse, and a display), memory 208, and one or more busses 210 to interconnect these components. The memory 208, which can include volatile or non-volatile memory or storage, can store an operating system 212, a control module 214, and a database (or one or more files) 216 which can include a plurality of records 218.

An operating system 212 can include procedures for handling various basic system services and for performing hardware dependent tasks. The one or more processing units 204 can execute, for example, tasks for control module 214 under the direction of operating system 212. The operating system 212 can also provide control module 214 with access to other system resources such as, but not limited to, memory 208 and user interface 206.

The control module 214 is designed to manipulate BERT 1 in accordance with the present invention. In particular, control module 214 interacts with controller 120 through I/O port 162 to initiate and monitor tests of DUT 170. As described in more detail below, control module 214 directs controller 120 to initialize one or more other components included in BERT 1 and, if need be, to obtain information about the one or more other components that are not connected directly to computer 160. The control module 214 can engage in such communication with controller 120 before, during, and after tests of DUT 170. The control module 214 can communicate results of DUT tests through user interface 206 as needed. Finally, computer 160 can communicate with other devices, such as Digital Communication Analyzers (not illustrated), during tests of DUT 170. Persons skilled in the art recognize that a Digital Communication Analyzer can provide additional information about the operation of DUT 170 by monitoring the data transmitted to/from DUT 170.

Although separate ports are illustrated in FIGS. 1 and 2 and discussed above with respect to various circuitry, some embodiments of the present invention can include additional or fewer ports without departing from the scope of the present invention. For example, a single data bus with address bits and corresponding ports can be substituted for some or all of the data ports and corresponding connections illustrated in FIG. 1. Additionally, some or all of the port connections, though illustrated in FIGS. 1 and 2 as single leads, may be formed by a plurality of separate leads. The configuration illustrated in FIGS. 1 and 2, therefore, represents just one exemplary embodiment and is not meant to limit the scope of the present invention.

Referring to FIGS. 3A–3D, there is shown a series of processing steps included in a first exemplary embodiment of the present invention for testing the jitter tolerance of DUT 170. The steps of FIGS. 3A–3D are illustrative of one method for testing jitter tolerance. However, one skilled in the art will understand that one or more of the steps can be eliminated, combined with other steps, or performed in a different order then described herein. Additionally, although the steps of FIGS. 3A–3D can be conceptually divided into four phases, other configurations can have a larger or smaller number of phases.

In a first phase (e.g., steps 302–304), the circuitry and devices illustrated in FIG. 1 are initialized. In a second phase (e.g., steps 306–330), a proper configuration of BERT 1, DUT 170, and master device 180 is confirmed and a seed value used by a BS generator during a third phase is identified. The second phase continues until consecutive groups of bits without any bit errors are transmitted or until it times out. In the third phase (e.g., steps 332–352), data needed to compute bit error rates for one or more simulated quantities of jitter, which are described in more detail below, is gathered. In a fourth phase (e.g., steps 354–358), the bit error rate(s) are calculated and/or the results of the test (attempt) are displayed.

Note that not all of the components illustrated in FIG. 1 are relevant to this embodiment of the present invention. Specifically, the processing steps of FIGS. 3A–3D are described, in connection with this exemplary embodiment, with the assumption that attenuator 190, second BS generator 60, and second SERDES 50 are not included in BERT 1 or otherwise used.

Figure 3A:
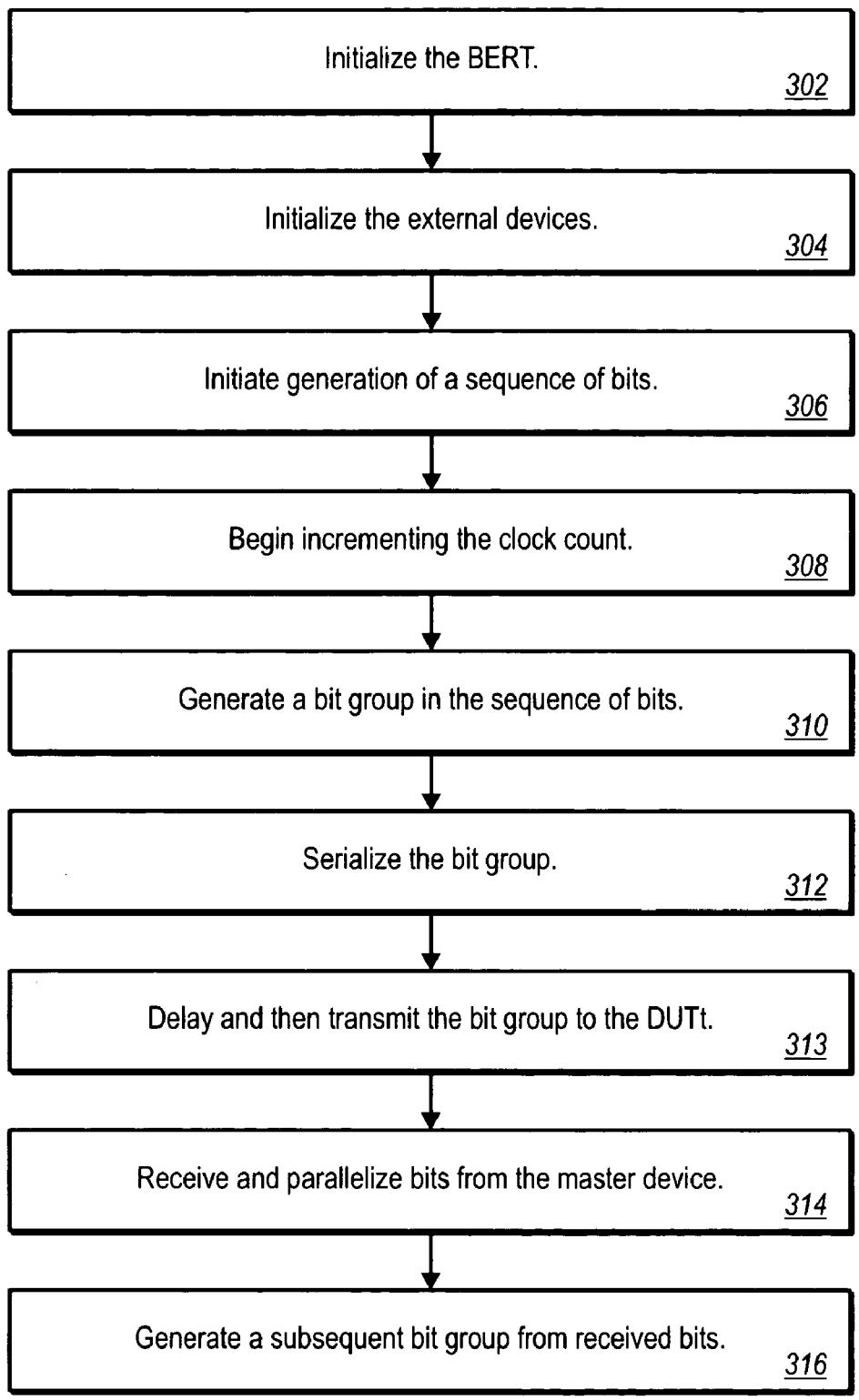
FIGS. 3A–3D illustrate processing steps of one exemplary embodiment of the present invention.

In a first step, control module 214 initializes BERT 1, as represented by block 302 in FIG. 3A. In particular, control module 214 directs controller 120 to turn clock source 110 on and to set the clock frequency of the clock signal generated by clock source 110. The control module 214 can also direct controller 120 to set the length, type, and other characteristics of bit sequences generated by BS generators 10, 100.

During the initialization, control module 214 can also direct controller 120 to clear clock count 127 and test data 138, create a new record 218 in database 216 to store results of a DUT 170 test, and direct controller 120 to set the delay value of delay 30. In exemplary embodiments of the present invention, this delay value is initially set to a value that is midway between the lowest and greatest delay values possible for delay 30. As indicated below, this provides the greatest amount of flexibility with respect to adjusting this delay value during the third phase.

The control module 214 then initializes external devices, as represented by 304. In particular, control module 214 directs controller 120 to turn on DUT 170 and master device 180 and enable the optical transmitter circuitry of DUT 170 by, for example, adjusting the state of a transmitter disable control signal.

The control module 214 then initiates the generation of a sequence of bits, as represented by block 306, and directs controller 120 to begin incrementing the value of clock count 127 in connection with a clock signal originating from clock source 110, as represented by block 308. The first task is completed by controller 120, under the direction of control module 214. In particular, controller 120 can transmit a seed value through its $D_{out}$ port 121 to $D_{in}$ port 12 of first BS generator 10. In some exemplary embodiments of the present invention, controller 120, under the direction of control module 214, also transmits a control signal through I/O ports of controller 120 and BS generator 10, respectively, to enable the generation of the sequence of bits by BS generator 10.

In response to the task performed in step 308, first BS generator 10 begins generating a sequence of bits by generating a bit group in the sequence of bits, as represented by block 310. Bit groups can be generated sequentially and transmitted in parallel. The BS generator 10 operates (i.e., generates bit groups) at the frequency of a clock signal originating from clock source 110 (connections not illustrated). The first BS generator 10 continues to generate bit groups in the sequence of bits (repeating the sequence of bits if necessary) until disabled by controller 120.

Each bit group generated by first BS generator 10 is serialized by the first SERDES 20 and transmitted to delay 30, as represented by block 312. In other words, first SERDES 20 receives bit groups through $D_{in}$ port 22 from first BS generator 10 in parallel, but transmits these bit groups serially through $D_{out}$ port 24. The serialized bits are then individually delayed by delay 30 and transmitted to DUT 170, as represented by block 313. In other words, delay 30 receives a bit through $D_{in}$ port 32 from first SERDES 20, delays the bit internally, and then transmits the bit through $D_{out}$ port 34 to DUT 170.

The DUT 170 receives bits transmitted by delay 30 through $D_{in}$ port 172 in an electrical form and transmits them in an optical form through $D_{out}$ port 174 to master device 180. The master device 180 receives bits transmitted by DUT 170 through $D_{in}$ port 186 in an optical form and transmits them in an electrical form through $D_{out}$ port 188 to third SERDES 90.

The third SERDES 90 receives bits transmitted serially by master device 180 and parallelizes them, as represented by block 314. Specifically, third SERDES 90 receives bits transmitted serially by master device 180 through $D_{in}$ port 92 and transmits these bits as a bit group in parallel through $D_{out}$ port 94 to both controller 120 and third BS generator 100.

The third BS generator 100 generates a subsequent bit group from the bit group received through $D_{in}$ port 102 from third SERDES 90, as represented by block 316. Bit sequences generated by the BS generators illustrated in FIG. 1 are deterministic, so when configured in the same manner, these BS generators generate the same bit group from a given bit group. The output of first BS generator 10 is fed back to first BS generator 10 to generate another bit group in the sequence of bits. Similarly, third BS generator 100 uses the bit group transmitted to it by third SERDES 90 as a seed value to generate a subsequent bit group in the sequence of bits. Because third BS generator 100 is configured to produce the same sequence of bits as first BS generator 10, third BS generator 100 generates the same bit group that first BS generator 10 generates from a given bit group.

The subsequent bit group is transmitted by third BS generator 100 through $D_{out}$, port 106 to fourth $D_{in}$ port 135 of controller 120, but the subsequent bit group is not output by third BS generator 100 until a subsequent clock cycle. While third SERDES 90 transmits the bit group to BS generator 100 in block 314, SERDES 90 parallelizes another bit group received from master device 180, as represented by block 318 in FIG. 3B.

As indicated above, parallelizing a bit group includes transmitting the bits in parallel to both controller 120 and third BS generator 100. Therefore, the bit group received in block 318 is transmitted to controller 120 during the same clock cycle in which the subsequent bit group generated by BS generator 100 in block 316, is transmitted to controller 120. The controller 120 compares the bit groups transmitted by third SERDES 90 and third BS generator 100, respectively, as represented by block 320, and stores the results of the comparison (e.g., the number of bit errors) as part of test data 128, as represented by block 322.

If there are any bit errors, i.e., one or more of the bits do not match, which corresponds to decision block 324 being answered "Yes", controller 120, checks the value of clock count 127 to determine whether it is greater than a predefined counter value, as represented by block 326. The predefined counter value can be maintained by either controller 120 or computer 160.

As noted above, the purpose of the second phase is to confirm the configuration of BERT 1, DUT 170, and master device 180 and to identify a seed value for third BS generator 100. If clock count 127 exceeds the predefined counter value, it may be safely assumed that BERT 1 DUT 170, and master device 180 are not configured properly.

Figure 3B:
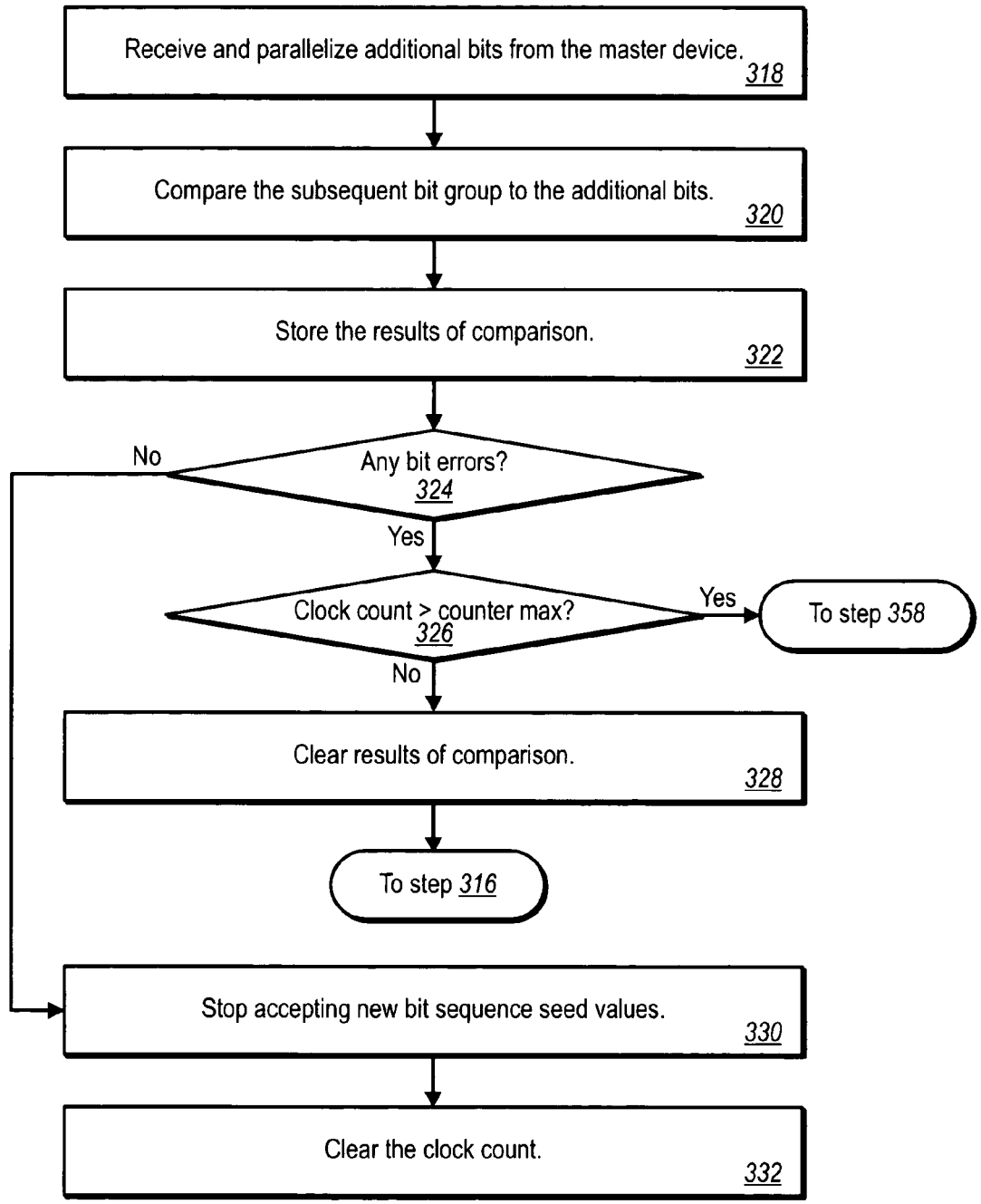

With continued reference to FIG. 3B, if the clock count 127 is not greater than the predefined counter value, which corresponds to decision block 326 being answered "No", controller 120, under the direction of control module 214, can clear the bit error count stored in the previous execution of step 322, as represented by block 328. The cycle of receiving bit groups, generating subsequent bits groups, and comparing the two then continues until there are no bit errors or clock count 127 exceeds the predefined counter value. Note that third BS generator 100 continues to accept new bit sequence seed values from third SERDES 90. Because there were one or more bit errors detected during the most recent bit group comparisons, it may be that the bit sequence seed values used to produce two of the compared bit groups are invalid.

If clock count 127 is greater than the predefined counter value, which corresponds to decision block 326 being answered "Yes", the results of the test can be displayed via user interface 206, as represented by block 358. If step 358 is reached in this fashion, the results will indicate that there is a problem with the configuration of DUT 170, master device 180, and/or the BERT 1 and that an actual jitter tolerance test was not completed.

Returning to step 324, if there are no bit errors, which corresponds to decision block 324 being answered "No", control module 214 directs third BS generator 100 to stop accepting bit groups from third SERDES 90, as represented by block 330, and clears clock count 127, as represented by block 332. Steps 330 and 332 mark the end of the third phase and the beginning of the fourth phase, respectively.

As indicated above, the third phase identifies a bit sequence seed value for third BS generator 100. This happens when consecutive bit group are transmitted without bit errors. This means that third BS generator 100 can now generate the exact bit sequence generated by first BS generator 10 without additional bit sequence seed values from third SERDES 90. Instead, the subsequent bit groups generated by third BS generator 100 will now be fed back to first BS generator 10 as seed values to generate additional subsequent bit groups. The controller 120 can direct third BS generator 100 to stop accepting bit groups from third SERDES 90 by, for example, transmitting control signals through I/O ports of controller 120 and third BS generator 100 respectively.

Figure 3C:
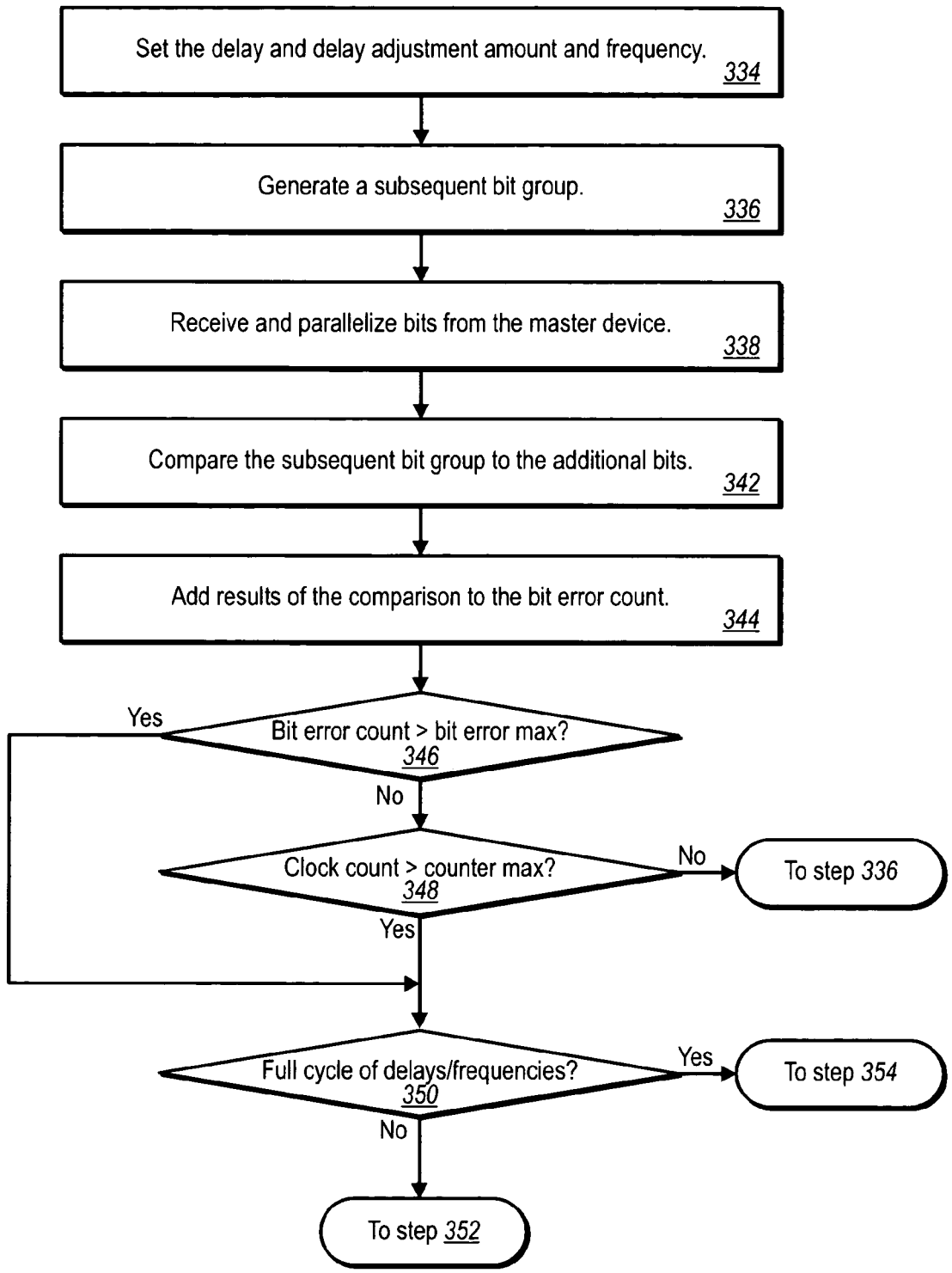

The controller 120 then sets the delay value of delay 30 and sets the delay adjustment amount and frequency within controller 120, as represented by block 334, in FIG. 3C. The delay value, the delay adjustment amount, and the delay adjustment frequency vary from one embodiment to another and are designed to simulate one or more quantities of jitter. The delay adjustment amount and the delay adjustment frequency are inversely related. In other words, as the delay adjustment amount decreases, the delay adjustment frequency increases, and vice versa. The delay value is typically one half of a given delay value subtracted from the value that is midway between the lowest and greatest delay values possible for delay 30.

An exemplary jitter tolerance test can include a set of delay adjustment frequencies of 10 Hz, 30 Hz, 300 Hz, 25 KHz and 250 KHz, and a set of delay adjustment amounts including 15 Unit Intervals (UI), 8 UI, 1.5 UI, and 0.15 UI, of the signal or bits received by DUT 170. A UI is the temporal duration of a single bit or a bit period. In this exemplary jitter tolerance test, the 10 Hz delay adjustment frequency corresponds to the 15 UI delay adjustment amount the 30 Hz delay adjustment frequency corresponds to the 8 UI delay adjustment amount, the 300 Hz delay adjustment frequency corresponds to the 5 UI delay adjustment amount, the 25 KHz delay adjustment frequency corresponds to the 1.5 UI delay adjustment amount, and the 250 KHz delay adjustment frequency corresponds to the 0.15 UI delay adjustment amount.

The controller 120 uses this information to adjust the delay value of delay 30 by a specified delay adjustment amount at a specified delay adjustment frequency. More specifically, controller 120 sets the delay value of delay 30 to a first value (i.e., the value at which delay 30 is set in step 302), waits one period of the specified delay adjustment frequency sets the delay value of delay 30 to the first value plus the unspecified delay adjustment amount, waits one or more periods of the specified delay adjustment frequency, sets the delay value of the delay 30 to the first value, etc.

Step 334 triggers these steps by controller 120, which continues to adjust the delay as described above until control module 214 resets the delay adjustment amount and/or frequency or otherwise terminates the adjustment of the delay. In some exemplary embodiments, the single adjustment at the end of the period (as described above) is replaced with a series of smaller steps throughout the period.

Adjusting the delay value of delay 30 in such a manner simulates one or more quantities of jitter depending upon the delay adjustment amount/frequency combination in use. As described above, jitter includes variations of temporal bit period boundaries. This simulation is sufficient to project a bit error rate of DUT 170 when its data input includes a specified quantity of jitter. Again, delay 30 settings can be changed pseudo randomly or by some other function at a specified frequency and amplitude.

The third BS generator 100 then generates a subsequent bit group from the previous "subsequent bit group", which is fed back to third BS generator 100, as represented by block 336. The subsequent bit group is transmitted by third BS generator 100 through $D_{out}$ ports 104 to $D_{in}$ port 125 of controller 120.

The third SERDES 90 receives bits transmitted serially by delay 30 and parallelizes them, as represented by block 338. More specifically, third SERDES 90 receives bits transmitted serially by master device 180 through $D_{in}$ port 92 and transmits these bits as a bit group in parallel through $D_{out}$ port 94 to both controller 120 and third BS generator 100.

The controller 120 then compares the bit groups transmitted by third SERDES 90 and the third BS generator 100, respectively, as represented by block 342. Controller 120 then adds a count of the bit errors (if any) to a count of bit error stored in test data 128 that corresponds to the current delay adjustment amount/frequency combination, as represented by block 344. The controller 120, under the direction of control module 214, then checks the count of bit errors that corresponds to the current delay adjustment amount and frequency combination to determine whether the count exceeds a predefined bit-error maximum value, as represented by block 346, which can be maintained by either controller 120 or computer 160. As noted above, the purpose of the third phase is to establish a bit error rate for DUT 170 in conjunction with a specified quantity of jitter. The test can be terminated if the count exceeds this predefined bit-error value, which corresponds to a bit error rate that is unacceptable for a given delay adjustment amount/frequency combination. These predefined bit errors can be found in various standards that the equipment must adhere to such as, but not limited to, SONET, Fiber channel, etc.

If the bit error count does not exceed the predefined bit-error value, which corresponds to decision block 346 being answered "No", controller 120, under the direction of control module 214, checks the value of clock count 127 to determine whether it exceeds a predefined counter value (i.e., a counter max), as represented by decision block 348. The predefined counter value is set to enable an accurate computation of a bit error rate at a given delay adjustment amount/frequency combination. This value can be maintained by either controller 120 or computer 160.

If the clock count 127 does not exceed the predefined counter value, which corresponds to decision block 348 being answered "No", the cycle of receiving bit groups, generating subsequent bits groups, and comparing the two continues. But if the clock count 127 does exceed the predefined counter value, which corresponds to decision block 348 being answered "Yes", or if the bit error count is greater than the predefined bit-error value, which corresponds to decision block 346 being answered "Yes", controller 120 determines whether a full set of delay adjustment amount/frequency combinations has been processed, as represented by block 350.

Figure 3D:
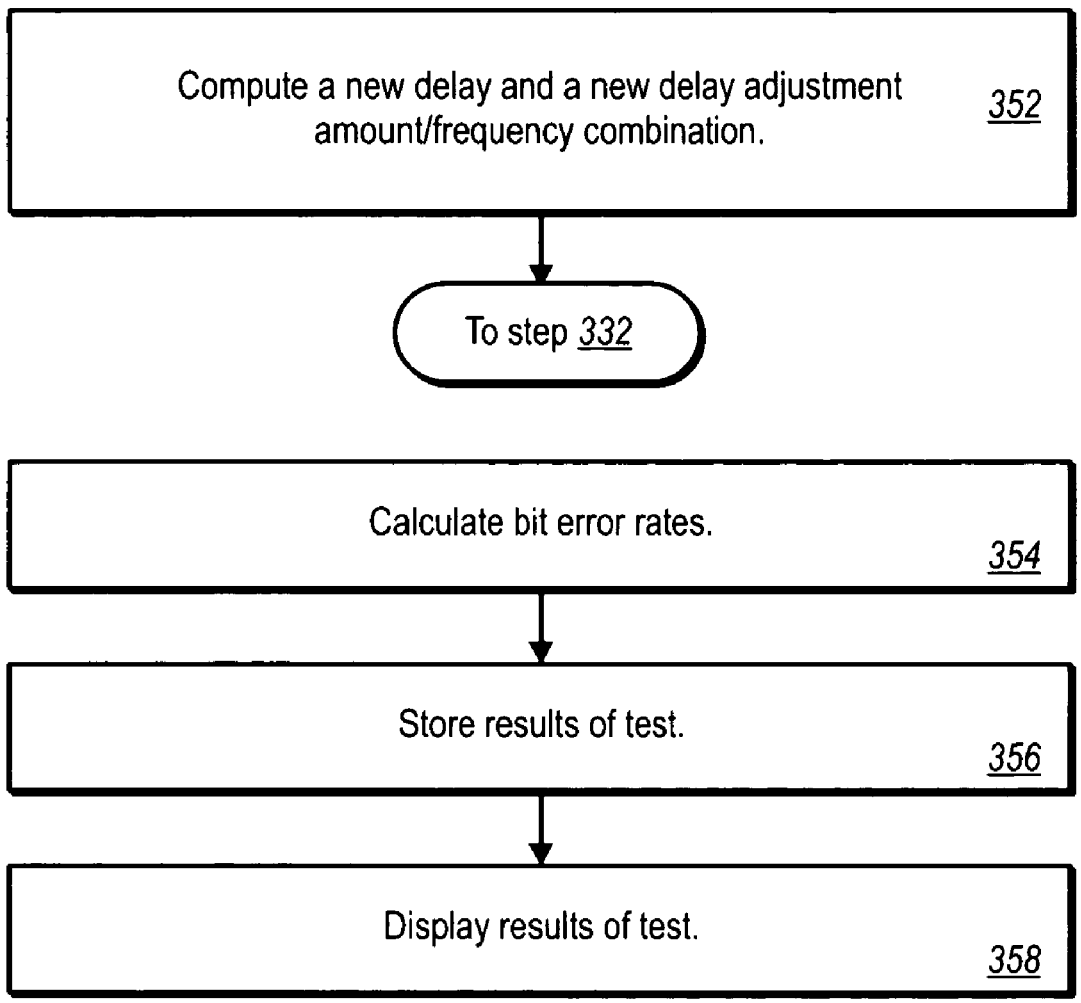

If not, which corresponds to decision block 350 being answered "No", controller 120 computes a new delay adjustment amount and/or frequency, as represented by block 352, in FIG. 3D. These steps can include checking a list of delay adjustment amount/frequency combinations specified by computer 160 for a next combination, if there is one. The controller 120 then clears clock count 127, as represented by block 332, and resets the delay value of delay 30 and its internal settings for the delay adjustment amount and frequency, as represented by block 334. Steps 336–348, as described above, are then re-executed for the newly set delay adjustment amount/frequency combination.

But, if the full set of delay adjustment amount/frequency combinations has been processed, which corresponds to decision block 350 being answered "Yes", controller 120 and/or computer 160 calculates bit error rates for each delay adjustment amount/frequency combination processed in the preceding steps, as represented by block 354. Bit error rates may be calculated by dividing each bit error count by the bit rate multiplied by the test time, which may be indicated by the predefined counter value if the test does not end prematurely.

The results of the DUT 170 test (e.g., bit error rate(s)), can be stored in newly created database record 218, as represented by block 356, and displayed via user interface 206, as represented by block 358. If steps 356 and 358 are reached in this fashion, the results will indicate the bit error rate(s) for DUT 170.

Referring now to FIGS. 4A–4D, there is shown a series of processing steps included in another exemplary embodiment of the present invention for testing the signal attenuation tolerance (sensitivity) of DUT 170. The steps of FIGS. 4A–4D are illustrative of one method for testing signal attenuation tolerance. However, one skilled in the art will understand that one or more of the steps can be eliminated, combined with other steps, or performed in a different order then described herein. Additionally, although the steps of FIGS. 4A–4D can be conceptually divided into four phases, other configurations can have a larger or smaller number of phases.

In a first phase, steps 402–404, the circuitry and devices illustrated in FIG. 1 are initialized. In a second phase, steps 406–430, a proper configuration of BERT 1, DUT 170, and master device 180 is confirmed and a seed value used by second BS generator 60 during a third phase is identified. The second phase continues until consecutive groups of bits without any bit errors are transmitted or until it times out. In the third phase, steps 432–452, data needed to compute bit error rates for one or more levels of signal attenuation, which are describers in more detail below, is gathered. In a fourth phase, steps 454–458 the bit error rate(s) are calculated and/or the results of the test (attempt) are displayed.

Note that not all of the components illustrated in FIG. 1 are relevant to this embodiment of the present invention. Specifically, the processing steps of FIGS. 4A–4D are described with the assumption that third BS generator 100 and third SERDES 90 are not included in BERT 1 or otherwise used. Even though each of the discussed embodiments only uses two of the three BS generators 10, 60, 100, all three generators can be used. For example, if DUT 160 is a transceiver, it is possible to test both the receiver part of the transceiver and the transmitter part of the transceiver using embodiments of the present invention. Having all three BS generators 10, 60, 100, allows simultaneous testing of both a receiver portion and a transmitter portion of DUT 170. When simultaneous testing of both the receiver portion and the transmitter portion of DUT 170, in one configuration, BS generator 10 substantially continually creates transmit data to master device 180 (FIG. 1) and/or DUT 170. In other configurations, BS generator 10 creates transmit data less than substantially continually.

Figure 4A:
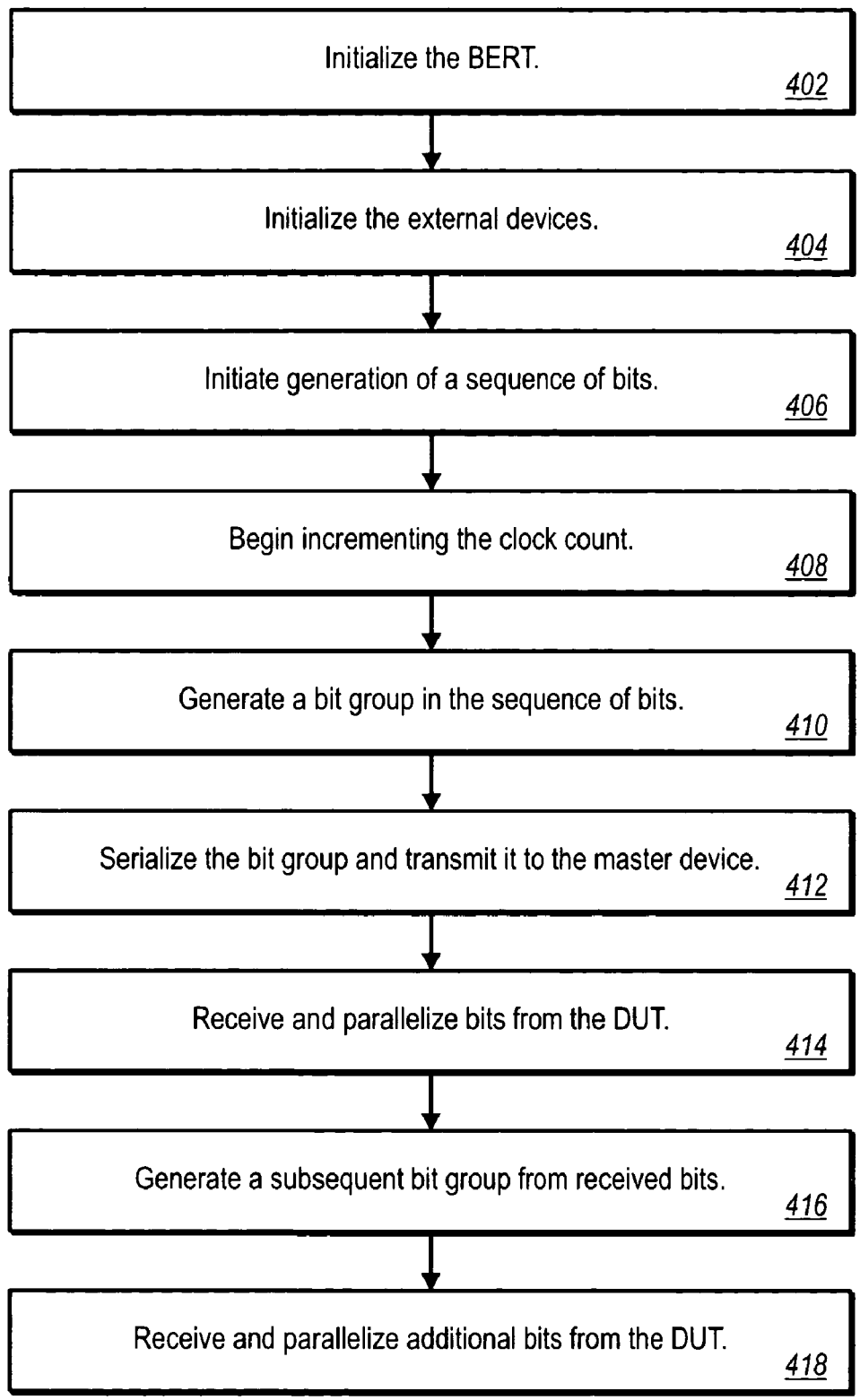
FIGS. 4A–4D illustrate processing steps of another exemplary embodiment of the present invention.

In a first step, control module 214 initializes BERT 1, as represented by block 402, in FIG. 4A. This step is essentially identical to step 302 which is described in detail above, with the exception that controller 120 can disable (or not enable) delay 30 so that no data is transmitted by delay 30 to DUT 170 during the second phase. Next, control module 214 Initializes external devices, as represented by block 404. Again, this step is essentially identical to step 304, which is described in detail above, with the exception that control module 214 also sets the attenuation level of attenuator 190 so that a signal transmitted thereby is not attenuated during the second phase by attenuator 190.

The control module 214 then initiates the generation of a sequence of bits, as represented by block 406, and directs controller 120 to begin incrementing the value of clock count 127 in connection with a clock signal originating from clock source 110, as represented by block 408. In response to step 408, first BS generator 10 begins generating a sequence of bits by generating a bit group in the sequence of bits as described above in connection with step 310, as represented by block 410.

Each bit group generated by first BS generator 10 is serialized by first SERDES 20 and transmitted to master device 180, as represented by block 412. More specifically, first SERDES 20 receives bit groups through $D_{in}$ port 22 from first BS generator 10 in parallel, but transmits these bit groups serially through $D_{out}$ port 24 to $D_{in}$ port 182 of master device 180 in an electrical form.

The master device 180, in turn transmits these bits optically through $D_{out}$ port 184 to attenuator 190. The attenuator 190 receives these bits through $D_{in}$ port 192 and transmits them through $D_{out}$ port 194 to DUT 170. The DUT 170 receives bits transmitted by attenuator 190 through $D_{in}$ port 176 in an optical form and transmits them in an electrical form through $D_{out}$ port 178 to second SERDES 50.

The second SERDES 50 receives bits transmitted serially by DUT 170 and parallelizes them, as represented by block 414. More specifically, second SERDES 50 receives bits transmitted serially by DUT 170 through $D_{in}$ port 52 and transmits these bits as a bit group in parallel through $D_{out}$ port 54 to both controller 120 and second BS generator 60.

The subsequent bit group is transmitted by second BS generator 60 through $D_{out}$ port 64 to third $D_{in}$ port 123 of the controller 120, as requested by block 416, but the subsequent bit group is not output by second BS generator 60 until a subsequent clock cycle. While second SERDES 50 transmits the bit group to second BS generator 60 in step 414, SERDES 50 parallelizes another bit group received from DUT 170, as represented by block 418. As indicated above, parallelizing a bit group includes transmitting the bits in parallel to both controller 120 and second BS generator 60. The bit group received in step 418 is transmitted to controller 120 during the same clock cycle in which the subsequent bit group generated by BS generator 60 in step 416 is transmitted to controller 120. The controller 120 compares the bit groups transmitted by second SERDES 50 and second BS generator 60, respectively, as represented by block 420 in FIG. 4B, and stores the results of the comparison (e.g., the number of bit errors) as part of test data 138, as represented by block 422.

If there are any bit errors, i.e., one or more of the bits do not match, which corresponds to decision block 424 being answered "Yes", controller 120 checks the value of clock count 127 to determine whether it is greater than a predefined counter value, as represented by decision block 426. The predefined counter value can be maintained by either controller 120 or computer 160.

If clock count 127 is not greater than the predefined counter value, which corresponds to decision block 426 being answered "No", controller 120, under the direction of control module 214, can clear the bit error count stored in the previous execution of step 422, as represented by block 428. The cycle of receiving bit groups, generating subsequent bits groups, and comparing the two then continues until there are no bit errors or clock count 127 exceeds the predefined counter value.

Figure 4B:
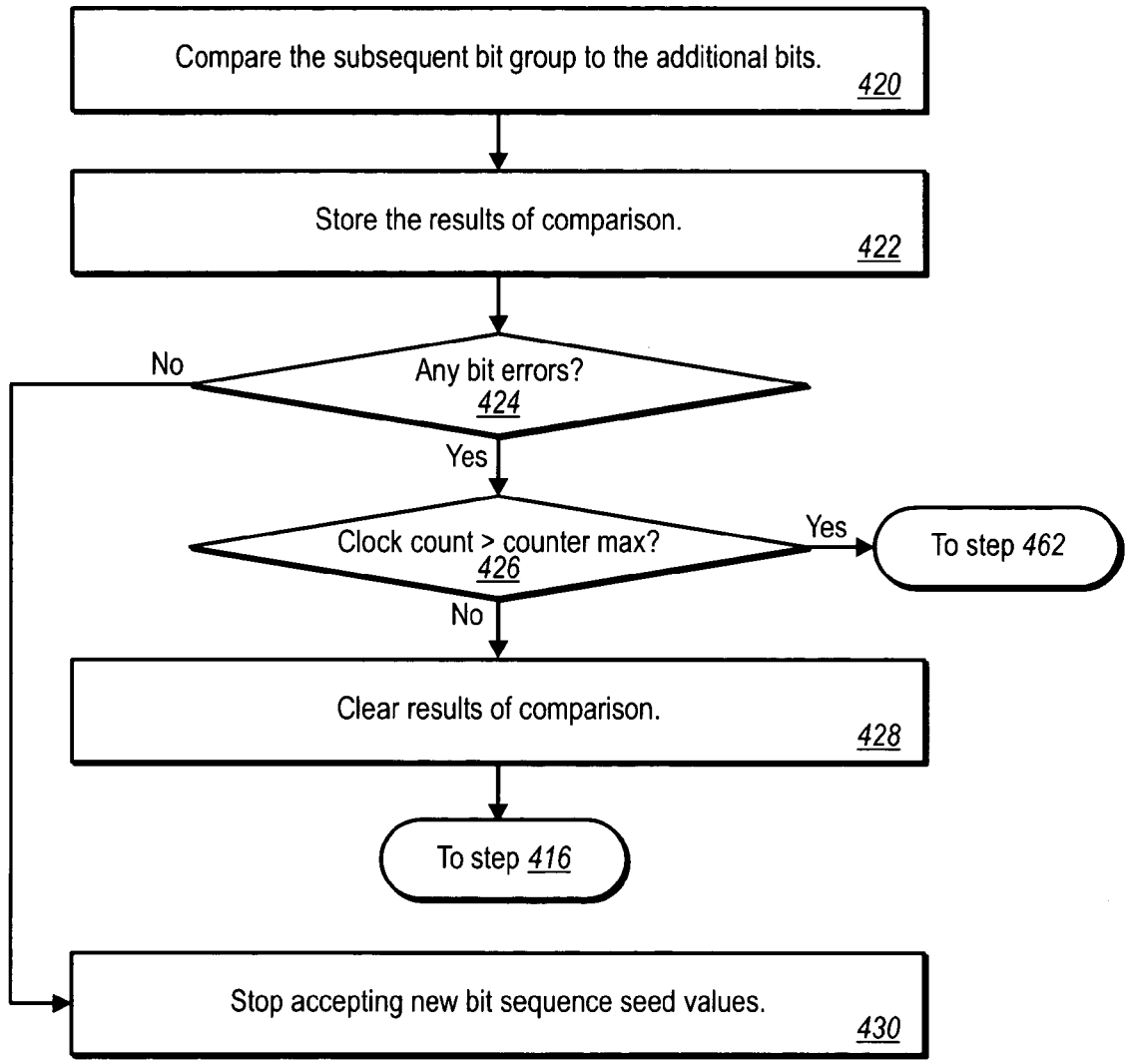
Figure 4C:
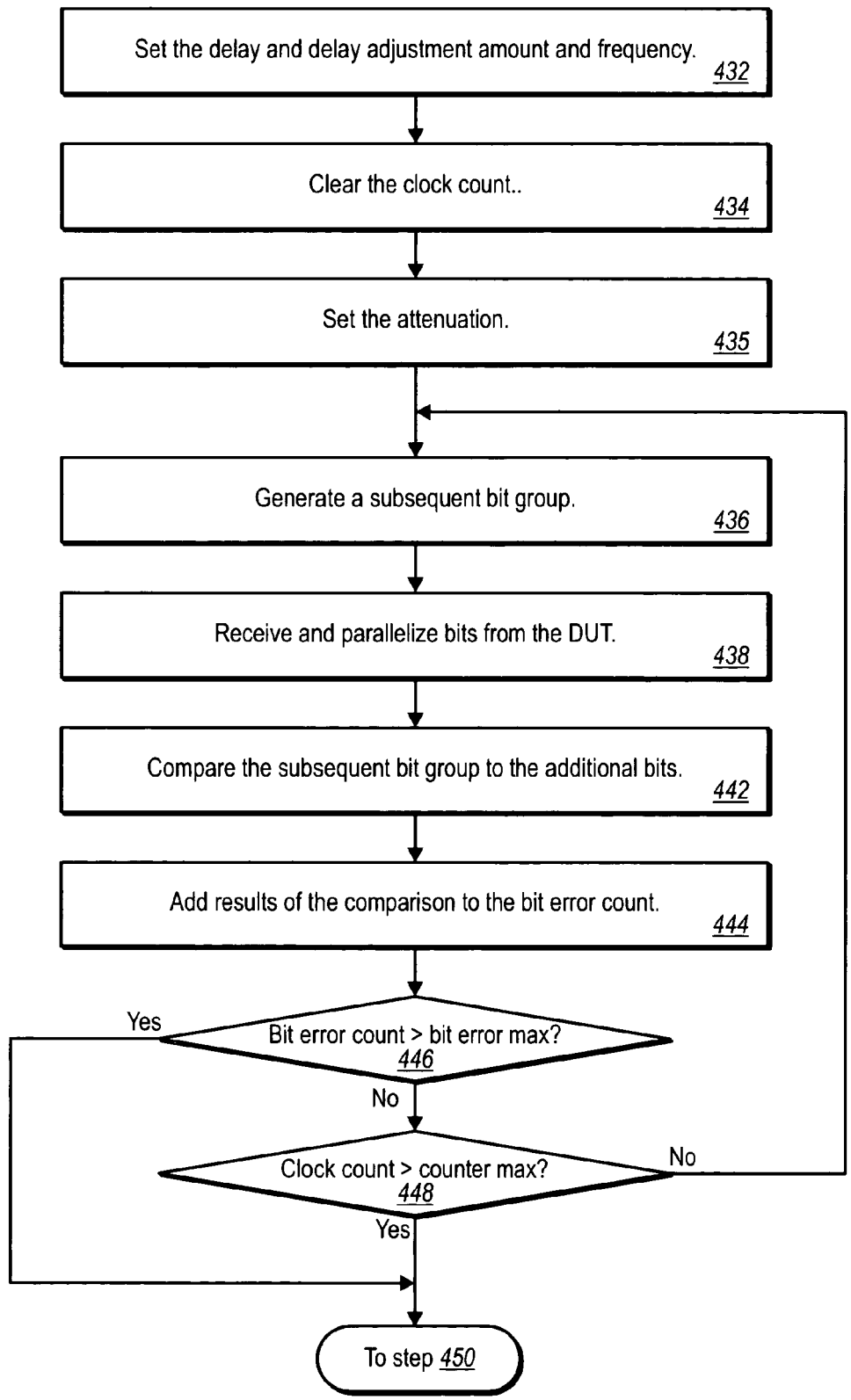
Figure 4D:
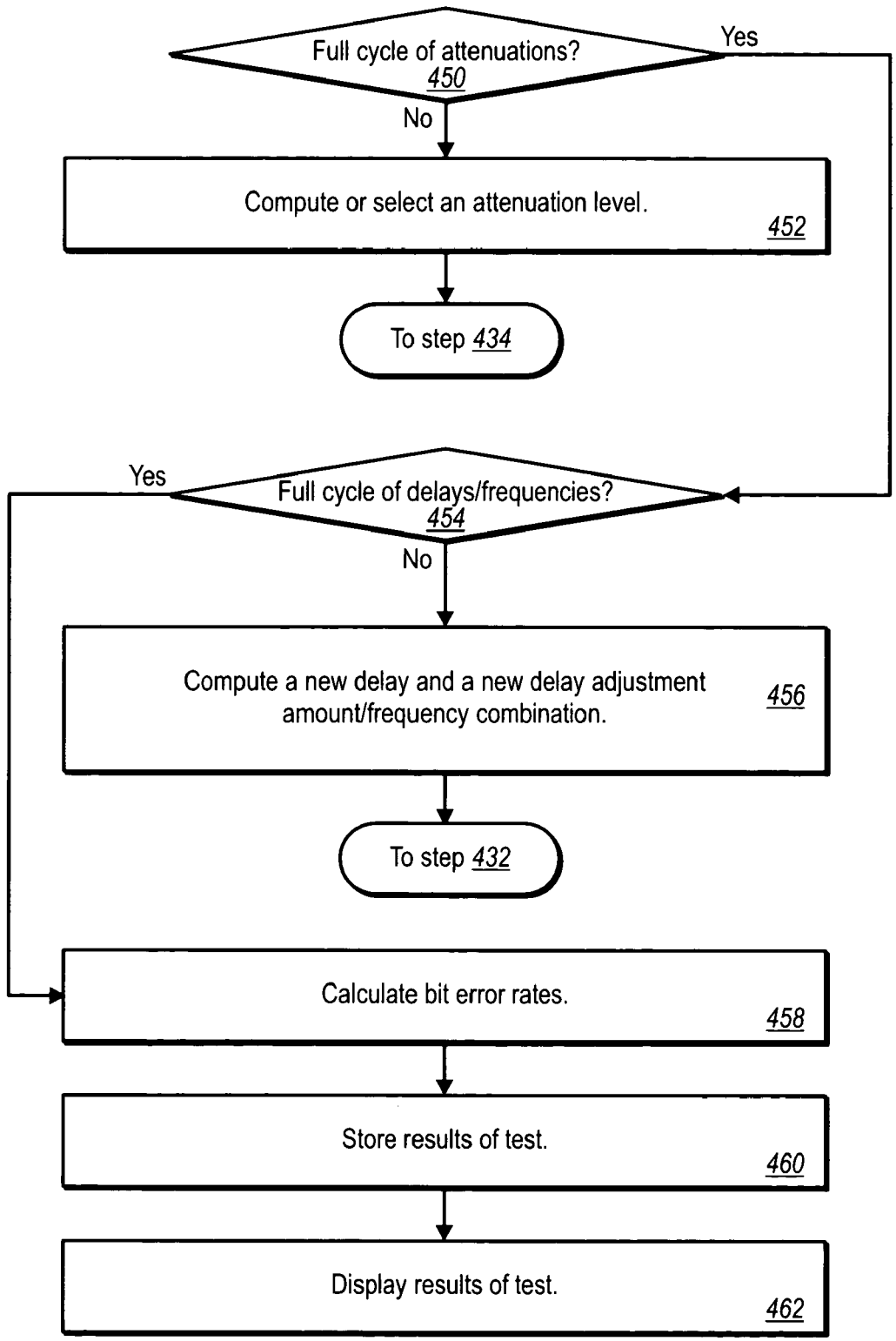

If clock count 127 is greater than the predefined counter value, which corresponds to decision block 426 being answered "Yes", the results of the test may be displayed via user interface 206, as represented by block 462 in FIG. 4D. If step 462 is reached in this fashion, the results will indicate that there is a problem with the configuration of DUT 170, master device 180, and/or BERT 1 and that an actual signal attenuation tolerance test was not completed.

Returning to step 424 in FIG. 4B, if there are no bit errors, which corresponds to decision block 424 being answered "No", control module 214 directs second BS generator 60 to stop accepting bit groups from second SERDES 50, as represented by block 430, sets the delay value of delay 30 and the delay adjustment amount and frequency within controller 120, as represented by block 432, in FIG. 4C, clears clock count 127, as represented by block 434, and sets the attenuation level of attenuator 190, as represented by block 435.

Step 432 is essentially identical to step 334, which is described in detail above, with the exception that it may include enabling delay 30 so that the signal received thereby from first SERDES 20 is transmitted to DUT 170, which in turn transmits the signal optically to master device 180. Further, the settings can be designed to simulate low to high frequency jitter (using either pseudo random or other increments as little as 1 picosecond).

For example, a simulation of low frequency jitter can include alternating the delay value of delay 30 between 0 and 20 picoseconds once every millisecond. A simulation of high frequency jitter can include alternating the delay value of delay 30 between 0 and 20 picoseconds once every microsecond. The purpose of sending a data stream through DUT 170 via delay 30 with the simulated jitter is to simulate "real world" conditions and, therefore, determine whether DUT 170 can accurately process an optical signal with a certain level of attenuation in the presence of another data signal, which may or may not cause cross-talk within DUT 170. Other, more sophisticated methods of injecting jitter may be used without departing from the scope of the present invention.

With respect to step 435, the attenuation level varies from one embodiment to the next. In one exemplary embodiment, the attenuation level can be set low (i.e., so that the signal is attenuated a minimal amount) and progressively increased (i.e., so that the signal is attenuated a maximum amount).

Following attenuation, second BS generator 60 then generates a subsequent bit group from the previous "subsequent bit group," which is fed back to second BS generator 60, as represented by block 436. The subsequent bit group is transmitted by second BS generator 60 through $D_{out}$ ports 64 to $D_{in}$ port 123 of controller 120. Next, second SERDES 50 receives bits transmitted serially by DUT 170 and parallelizes them, as represented by block 438.

The controller 120 then compares the bit groups transmitted by second SERDES 50 and second BS generator 60, respectively, as represented by block 442, and adds a count of the bit errors (if any) to a count of bit errors stored in test data 138 that corresponds to the current attenuation level of attenuator 190, as represented by block 444. The controller 120, under the direction of control module 214, then checks the count of bit errors that corresponds to the current delay adjustment amount and frequency combination to determine whether the count exceeds a predefined bit-error value, as represented by block 446.

If the bit error count does not exceed the predefined bit-error value, which corresponds to decision block 446 being answered "No", controller 120, under the direction of control module 214, checks the value of clock count 127 to determine whether it exceeds a predefined counter value, as represented by decision block 448. The predefined counter value is set to enable an accurate computation of a bit error rate at a given level of attenuation (and simulated jitter). This value may be maintained by either controller 120 or computer 160.

If clock count 127 does not exceed the predefined counter value, which corresponds to decision block 448 being answered "No", the cycle of receiving bit groups, generating subsequent bits groups, and comparing the two continues. But if clock count 127 does exceed the predefined counter value, which corresponds to decision block 448 being answered "Yes", or if the bit error count is greater than the predefined bit-error value, which corresponds to decision block 446 being answered "Yes", controller 120 determines whether a full set of attenuation levels has been processed, as represented by decision block 450, in FIG. 4D.

If not, which corresponds to decision block 450 being answered "No", control module 214 computes or selects an attenuation level, as represented by block 452. The control module 214 then clears clock count 127 via controller 120, as represented by block 434, and sets the attenuation level of attenuator 190, as represented by block 435. Steps 436–448, as described above, are then re-executed for the newly set attenuation level of attenuator 190.

But if the full set of attenuation levels has been processed, which corresponds to decision block 450 being answered "Yes", controller 120 determines whether a full set of delay adjustment amount/frequency combinations has been processed, which is represented by decision block 454. As described above, the delay value of delay 30 can be modulated to simulate low to high frequency jitter. A full set can include, therefore, high or low frequency jitter or one or more other frequencies of jitter.

If the full set of delay adjustment amount/frequency combinations has not been processed, which corresponds to decision block 454 being answered "No", controller 120 computes a new delay adjustment amount and/or frequency as described above in connection with step 352, as represented by block 456. The control module 214 then resets the delay value of delay 30 and controller 120 settings for the delay adjustment amount and frequency as represented by block 432, clears clock count 127 via controller 120, as represented by block 434, and sets the attenuation level of attenuator 190, as represented by block 435. Steps 436–448, as described above, are then re-executed for the newly level of simulated jitter. These steps preferably include an additional full cycle of attenuation levels in conjunction with the current delay adjustment amount/frequency combination.

But if the full set of delay adjustment amount/frequency combinations has been processed, which corresponds to decision block 454 being answered "Yes", controller 120 and/or computer 160 calculates bit error rates for each delay adjustment amount/frequency and attenuation level combination processed in the preceding steps, as represented by block 458. Bit error rates may be calculated by dividing each bit error count by the predefined counter value. The results of the DUT 170 test (e.g., bit error rate(s)), can be stored in newly created database record 218, as represented by block 460, and displayed via user interface 206, as represented by block 462. If steps 456 and 458 are reached in this fashion, the results will indicate the bit error rate(s) for DUT 170.

While exemplary embodiments of the present invention have been disclosed, it will be understood that in view of the foregoing description, other configurations can provide one or more of the features of the present invention, and all such other configurations are contemplated to be within the scope of the present invention. Accordingly, it should be clearly understood that the embodiments of the invention described above are not intended as limitations on the scope of the invention, which is defined only by the claims that are now or may later be presented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for determining a jitter tolerance of an optoelectronic device, comprising:
   a generation circuit configured to generate a first sequence of bits and to transmit said first sequence of bits to a delay circuit configured to individually transmit each of said bits in said first sequence of bits to said optoelectronic device, each bit of said first sequence of bits subject to a delay prior to being transmitted to said opto-electronic device; and
   comparison circuitry configured to receive a second sequence of bits from said optoelectronic device, said second sequence of bits being derived by said optoelectronic device from said first sequence of bits;
   wherein said comparison circuitry compares said second sequence of bits to said first sequence of bits and wherein said jitter tolerance of said opto-electronic device is determined by reference to said comparison.

2. The system of claim 1, wherein said delay is changed by a predefined amount at a predefined frequency.

3. The system of claim 1, wherein said delay is changed by a plurality of predefined amounts at a plurality of predefined frequencies.

4. The system of claim 1, wherein said optoelectronic device is a transceiver.

5. The system of claim 1, wherein said generation circuit includes a bit sequence generator and a serializer/deserializer.

6. The system of claim 1, wherein said comparison circuitry includes a controller that receives said first and second sequences of bits and compares said sequences to determine a number of bit errors, and wherein said number of bit errors is used to determine said jitter tolerance.

7. In a system for measuring a jitter tolerance of an optoelectronic device, said system being adapted to electrically communicate with said optoelectronic device and at least one master device, said system comprising a first bit sequence generator, a second bit sequence generator, a delay circuit, and a controller, a method for computing said jitter tolerance comprising the steps of:
   generating a first sequence of bits and transmitting said first sequence of bits to said delay circuit;
   delaying said first sequence of bits and individually transmitting each bit in said first sequence of bits to said optoelectronic device;
   transmitting a second sequence of bits from said optoelectronic device to said controller, said second sequence of bits derived by said optoelectronic device from said first sequence of bits;
   comparing said first sequence of bits to said second sequence of bits to calculate a bit error rate; and
   using said bit error rate to determine said jitter tolerance.

8. The method of claim 7, wherein said delaying step includes delaying said first sequence of bits by a predefined amount at a predefined frequency.

9. The method of claim 7, wherein said delaying step includes delaying said first sequence of bits by a plurality of predefined amounts at a plurality of predefined frequencies.

10. The method of claim 7, wherein said optoelectronic device is a transceiver.

11. A system for determining a signal attenuation tolerance of an optoelectronic device, comprising:
    a generation circuit configured to generate a first sequence of bits and to transmit said first sequence of bits to a delay circuit configured to delay said first sequence of bits and to then individually transmit each bit in said first sequence of bits to an attenuator configured to perform an attenuation of a power level of said first sequence of bits by a predefined amount and to then transmit said first sequence of bits to said optoelectronic device; and
    comparison circuitry configured to receive a second sequence of bits from said optoelectronic device, said second sequence of bits being derived by said optoelectronic device from said first sequence of bits;
    wherein said comparison circuitry compares said second sequence of bits to said first sequence of bits and wherein said signal attenuation tolerance of said optoelectronic device is determined by reference to said comparison.

12. The system of claim 11, wherein said comparison circuitry includes a controller that receives said first and second sequences of bits and compares said sequences to determine a number of bit errors, and wherein said number of bit errors is used to determine said attenuation tolerance.

13. The system of claim 12, wherein said delay is changed by a predefined amount at a predefined frequency.

14. The system of claim 13, wherein said attenuator is configured to attenuate said power level at a plurality of attenuation levels, and wherein, for each attenuation level, said delay is changed by said predefined amount at said predefined frequency, and a bit error rate is calculated for each of said attenuation levels, said bit error rates being combined to determine said attenuation tolerance.

15. The system of claim 12, wherein said delay is changed by a plurality of predefined amounts at a plurality of predefined frequencies.

16. The system of claim 15, wherein said attenuator is configured to attenuate said power level at a plurality of attenuation levels, and wherein, for each attenuation level, said delay is changed by each of said predefined amounts at each of said predefined frequencies to form a plurality of data points, and a bit error rate is calculated for each data point of said plurality of data points, said bit error rates for each data point of said plurality of data points being combined to determine said attenuation tolerance.

17. The system of claim 11, wherein said optoelectronic device is a transceiver.

18. In a system for measuring an attenuation tolerance of an optoelectronic device, said system being adapted to electrically communicate with said optoelectronic device and an optical attenuator, said system comprising a first bit sequence generator, a second bit sequence generator, a delay circuit, and a controller, a method for computing said attenuation tolerance comprising the steps of:
   generating a first sequence of bits and transmitting said first sequence of bits to said delay circuit;
   delaying said first sequence of bits and individually transmitting said first sequence of bits to said optoelectronic device;
   transmitting a second sequence of bits from said optoelectronic device to said optical attenuator, said second sequence of bits derived by said optoelectronic device from said first sequence of bits;
   attenuating a power level of said second sequence of bits and transmitting said first sequence of bits and said second sequence of bits to said controller;
   comparing said first sequence of bits to said second sequence of bits to calculate a bit error rate; and
   using said bit error rate to determine said attenuation tolerance.

19. The method of claim 18, wherein said delaying step includes delaying said first sequence of bits by a predefined amount at a predefined frequency.

20. The method of claim 19, wherein said attenuating step includes attenuating said power level at a plurality of attenuation levels, and wherein, for each attenuation level, said delay is changed by said predefined amount at said predefined frequency, and said bit error rate is calculated for each of said attenuation levels, said bit error rates being combined to determine said attenuation tolerance.

21. The method of claim 18, wherein said delaying step includes delaying said first sequence of bits by a plurality of predefined amounts at a plurality of predefined frequencies.

22. The method of claim 21, wherein said attenuating step includes attenuating said power level at a plurality of attenuation levels, and wherein, for each attenuation level, said delay is changed by each of said predefined amounts at each of said predefined frequencies to form a plurality of data points, and said bit error rate is calculated for each data point of said plurality of data points, said bit error rates for each data point of said plurality of data points being combined to determine said attenuation tolerance.

* * * * *

UNITED STATES PATENT AND TRADEMARK OFFICE
CERTIFICATE OF CORRECTION

PATENT NO. : 6,985,823 B2
APPLICATION NO. : 10/696253
DATED : January 10, 2006
INVENTOR(S) : Fishman et al.

It is certified that error appears in the above-identified patent and that said Letters Patent is hereby corrected as shown below:

Drawings
Sheet 1, Figure 1, change the label "$D_{in}$ 196" to --I/O 196--

Column 3
Line 17, change "that is more" to --that are more--

Column 4
Line 8, change "embodiments" to --embodiment--

Column 6
Line 47, change "is described" to --are described--

Column 7
Lines 41 and 42, change "$D_{in}$ ports 192, 196" to --a $D_{in}$ port 192--

Column 8
Line 40, change "then" to --than--

Column 9
Line 7, change "138" to --128--
Line 16, change "304" to --block 304--

Column 10
Line 21, change "106" to --104--
Line 21, change "135" to --125--

Column 12
Line 21, change "ports" to --port--
Line 33, change "error" to --errors--
Line 63, change "bits groups" to --bit groups--

Column 13
Line 54, change "is gathered" to --are gathered--
Line 64, change "DUT 160" to --DUT 170--

Column 15
Line 16, change "bits" to --bit--

Column 16
Line 30, change "bits groups" to --bit groups--
Line 66, change "newly level" to --newly set level--

UNITED STATES PATENT AND TRADEMARK OFFICE
CERTIFICATE OF CORRECTION

PATENT NO. : 6,985,823 B2
APPLICATION NO. : 10/696253
DATED : January 10, 2006
INVENTOR(S) : Fishman et al.

It is certified that error appears in the above-identified patent and that said Letters Patent is hereby corrected as shown below:

Column 17
Line 14, change "456 and 458" to --460 and 462--

Signed and Sealed this

Eighteenth Day of March, 2008

JON W. DUDAS
*Director of the United States Patent and Trademark Office*